United States Patent
Nakamura

(10) Patent No.: US 9,230,747 B2
(45) Date of Patent: Jan. 5, 2016

(54) DYE-SENSITIZED TYPE SOLAR CELL

(75) Inventor: Masaki Nakamura, Hyogo (JP)

(73) Assignee: USHIO DENKI KABUSHIKI KAISHA, Tokyo (JP)

( * ) Notice: Subject to any disclaimer, the term of this patent is extended or adjusted under 35 U.S.C. 154(b) by 28 days.

(21) Appl. No.: 14/124,252

(22) PCT Filed: Jun. 5, 2012

(86) PCT No.: PCT/JP2012/064442
§ 371 (c)(1),
(2), (4) Date: Dec. 6, 2013

(87) PCT Pub. No.: WO2012/169488
PCT Pub. Date: Dec. 13, 2012

(65) Prior Publication Data
US 2014/0102525 A1    Apr. 17, 2014

(30) Foreign Application Priority Data

Jun. 7, 2011  (JP) .................................. 2011-126936
Mar. 27, 2012  (JP) .................................. 2012-070532

(51) Int. Cl.
*H01L 31/00*  (2006.01)
*H01G 9/20*  (2006.01)
*H01M 14/00*  (2006.01)

(52) U.S. Cl.
CPC ............ *H01G 9/2022* (2013.01); *H01G 9/2081* (2013.01); *H01G 9/2086* (2013.01); *H01M 14/005* (2013.01); *Y02E 10/542* (2013.01); *Y02E 60/13* (2013.01)

(58) Field of Classification Search
CPC . H01G 9/2059; H01G 9/2068; H01G 9/2081; H01G 9/2022; H01G 9/2077; H01G 9/2027; H01G 9/2086; Y02E 10/50; Y02E 10/52; Y02E 10/542; Y02E 60/13; H01M 14/005
See application file for complete search history.

(56) References Cited

U.S. PATENT DOCUMENTS

2006/0268493 A1* 11/2006 Miyasaka et al. ............. 361/502
2007/0119499 A1*  5/2007 Shin et al. ..................... 136/263
(Continued)

FOREIGN PATENT DOCUMENTS

JP    2006-332469 A    12/2006
JP    2007-12545 A      1/2007
(Continued)

OTHER PUBLICATIONS

International Search Report for PCT/JP2012/064442, Sep. 11, 2012.

*Primary Examiner* — Eli Mekhlin

(57) ABSTRACT

A dye-sensitized solar cell includes: a collective electrode having a light-transmitting function, a photoelectrode to be electrically connected to the collective electrode and being a semiconductor layer having a dye adsorbed thereon, and a counter electrode apart from the photoelectrode arranged in the interior of a tube-shaped vessel formed of a transparent glass; glass sealed portions formed at both ends of the tube-shaped vessel; external leads penetrating through the glass sealed portions and drawn out of the tube-shaped vessel; and an electrolytic solution filled in the tube-shaped vessel and hermetically sealed wherein the counter electrode includes an electric double-layer capacitor, the electric double-layer capacitor includes the counter electrode which also serves as a positive polarized electrode, a negative polarized electrode arranged apart therefrom inside of the counter electrode, and a separator arranged between the counter electrode and the negative polarized electrode, and the electrolytic solution filled therein.

4 Claims, 8 Drawing Sheets

(56) References Cited

U.S. PATENT DOCUMENTS

2008/0072957 A1* 3/2008 Chang et al. .................. 136/256
2009/0310281 A1* 12/2009 Hirose et al. .................. 361/502

FOREIGN PATENT DOCUMENTS

| JP | 2009-081046 A | 4/2009 |
| JP | 4788848 B2 | 10/2011 |

* cited by examiner

DYE-SENSITIZED TYPE SOLAR CELL

TECHNICAL FIELD

The present invention relates to a dye-sensitized type solar cell. Specifically, the present invention relates to a dye-sensitized solar cell having a translucent tube-shaped vessel.

BACKGROUND ART

In the related art, a solar cell is under development as a new energy source having less effect on a global environment.

For example, a dye-sensitized type solar cell including an electrolytic solution filled into an interior of a transparent vessel, provided with a photoelectrode formed of a porous semiconductor including a dye adsorbed thereto and a counter electrode, and configured to release electrons from the dye irradiated with solar light and get electric energy therefrom.

The solar cell of this type does not require a high-vacuum chamber or the like for manufacture, and hence causes a low-impact in terms of facilities, and achieves a low-cost manufacture.

By the way, the solar cell is confronted with the challenge of being incapable of supplying power during the night because no power is generated due to a configuration thereof which generates power by solar light.

In order to handle such challenge, a solar cell provided with a power storage function added thereto so as to supply power stably during both the day and the night is known (Patent Literature 1).

FIG. 15 is a cross-sectional view illustrating a configuration of a solar cell described in Patent Literature 1.

A solar cell 91 includes a power generating portion 92, a power storage portion 93, and a common electrode 95.

The power generating portion 92 constitutes a so-called "Grätzel Cell" type dye-sensitized type solar cell by including a photoelectrode 94 including photosensitizing dyes 94d adsorbed to a semiconductor layer 94e formed on a translucent substrate, a first electrolytic solution 97 filled between the photoelectrode 94 and the common electrode 95, and a catalyst layer 96 formed on one of side surfaces of the common electrode 95.

In contrast, the power storage portion 93 includes a first conductive polymeric molecule layer 910 on a side opposite to the catalyst layer 96 of the common electrode 95, a second electrolytic solution 98 filled therein, and an power storage portion electrode 99 insulated thereby and having a second conductive polymeric molecule layer 911.

In FIG. 15, reference numeral 100 denotes a load.

When the power generating portion 92 receives solar light and generates power, generated electrons move to the power storage portion electrode 99 via the photoelectrode 94, cause undoping in the second conductive polymeric molecule layer 911 of the power storage portion electrode 99, and release anion into the second electrolytic solution 98. The released anion causes doping in the first conductive polymeric molecule layer 910, and stores holes in the first conductive polymeric molecule layer 910. In this configuration, the power is stored between the common electrode 95 and the power storage portion electrode 99. According to the solar cell 91, when the light is received, the power generating portion 92 generates power and supplies the power and, simultaneously, stores electrons in the power storage portion 93, and when reception of the light is stopped, power can be supplied by releasing electrons from the power storage portion 93, so that stable power supply is achieved even when light is reduced.

In this manner, an invention which makes an attempt to store power by using an electrolytic solution in the dye-sensitized solar cell is known in the related art.

CITED REFERENCE

Patent Literature

PTL 1: JP-A-2009-081046

SUMMARY OF INVENTION

Technical Problem

However, since the invention described above utilizes the electrolytic solution for power storage, leakage of the electrolytic solution has been a concern. It is caused because the Grätzel Cell is generally sealed with a resin, and the resin exposed to UV rays contained in solar light is deteriorated, whereby the electrolytic solution leaks out therefrom.

As a method of preventing such liquid leakage, usage of gelatinous electrolyte is known, but an increase in impedance is a concern.

In particular, when an attempt is made to add the power storage function while using the electrolytic solution of the dye-sensitized solar cell, the number of conducting wires drawn out of the cell increases and hence the number of sealed points increases, so that liquid leakage is accelerated.

In view of such circumstances described above, the present invention provides a dye-sensitized solar cell having a reliable sealed portion having a power storage function in a simple and compact structure, and simultaneously, having no probability of leakage of the electrolytic solution.

Solution to Problem

In order to solve the above-described problem, the prevent invention provides a dye-sensitized solar cell includes: a collective electrode having a light-transmitting function, a photoelectrode to be electrically connected to the collective electrode and being a semiconductor layer having a dye adsorbed thereon, and a counter electrode apart from the photoelectrode arranged in the interior of a tube-shaped vessel formed of a transparent glass; glass sealed portions formed at both ends of the tube-shaped vessel; a plurality of external leads penetrating through the glass sealed portions and drawn out of the tube-shaped vessel; and an electrolytic solution filled in the tube-shaped vessel and hermetically sealed, and is characterized in that the counter electrode includes an electric double-layer capacitor, the electric double-layer capacitor includes the counter electrode which also serves as a positive polarized electrode, a negative polarized electrode arranged apart therefrom inside of the counter electrode, and a separator arranged between the counter electrode and the negative polarized electrode, and the electrolytic solution filled therein.

Also, the present invention is characterized in that the tube-shaped vessel is a circular tube-shaped vessel having a circular cross section in a longitudinal direction thereof, and the counter electrode has an arcuate shaped portion.

Also, the present invention is characterized in that the counter electrode and the electric double-layer capacitor are formed of a roll body formed by winding a band-shaped laminated sheet, the laminated sheet includes: a layer forming a counter electrode which also serves as a positive polarized electrode, a layer forming a negative polarized electrode arranged apart therefrom on the inside of the counter electrode, and a separator arranged between the counter electrode and the negative polarized electrode, and a portion between the layer forming the counter electrode and the layer forming the negative polarized electrode is filled with electrolysis which constitutes the electrolytic solution.

Also, the present invention is characterized in that an electric double-layer capacitor formed between the positive polarized electrode and the negative polarized electrode of an $n^{th}$ turn ($n \geq 1$) of the roll body, and a capacitor formed between a positive polarized electrode of the $n^{th}$ turn and a negative polarized electrode of the $n+1^{th}$ turn are in the parallel relationship.

Also, the present invention is characterized in that a metal foil electrically connected to the photoelectrode and a part of a lead connected to both ends of the metal foil, a metal foil electrically connected to the counter electrode and a part of a lead connected to both ends of the metal foil, and a metal foil electrically connected to the negative polarized electrode and a part of a lead connected to both ends of the metal foil are embedded in an inside of the glass sealed portions of the tube-shaped vessel so as to be electrically insulated from each other.

Advantages and Effects of Invention

The dye-sensitized solar cell of the present invention has the power storage function in the interior of the counter electrode, and hence is capable of supplying power even when no light is received.

In addition, since the sealed portions of the tube-shaped vessel are formed of glass, deterioration due to UV ray does not occur and leakage of the electrolytic solution does not occur.

Also, according to the present invention, since the solar cell is formed of the cylindrical tube-shaped vessel, the surface areas of the photoelectrode and the polarized electrode of the electric double-layer capacitor of the solar cell may be increased, and hence the efficiencies of power generation and power storage may be increased.

Also, according to the present invention, since the electric double-layer capacitor positioned on the inside of the counter electrode having the arcuate-shaped portion has a multilayer structure by forming the roll body with the laminated sheet, the surface area of the electric double-layer capacitor can be dramatically increased by effectively using the space which is formed on the inside of the counter electrode, and hence the power storage function is extremely improved.

Also, according to the present invention, since the electric double-layer capacitor and the capacitor in the relation parallel to the electric double-layer capacitor are formed, the practical surface area of the electric double-layer capacitor is increased, whereby the electric capacitor is improved. Accordingly, the power storage efficiency is further improved.

Also, according to the present invention, since the glass sealed portions have a so-called foil sealed structure, the hermeticity of the seal is high.

DESCRIPTION OF EMBODIMENTS

Figure 1:
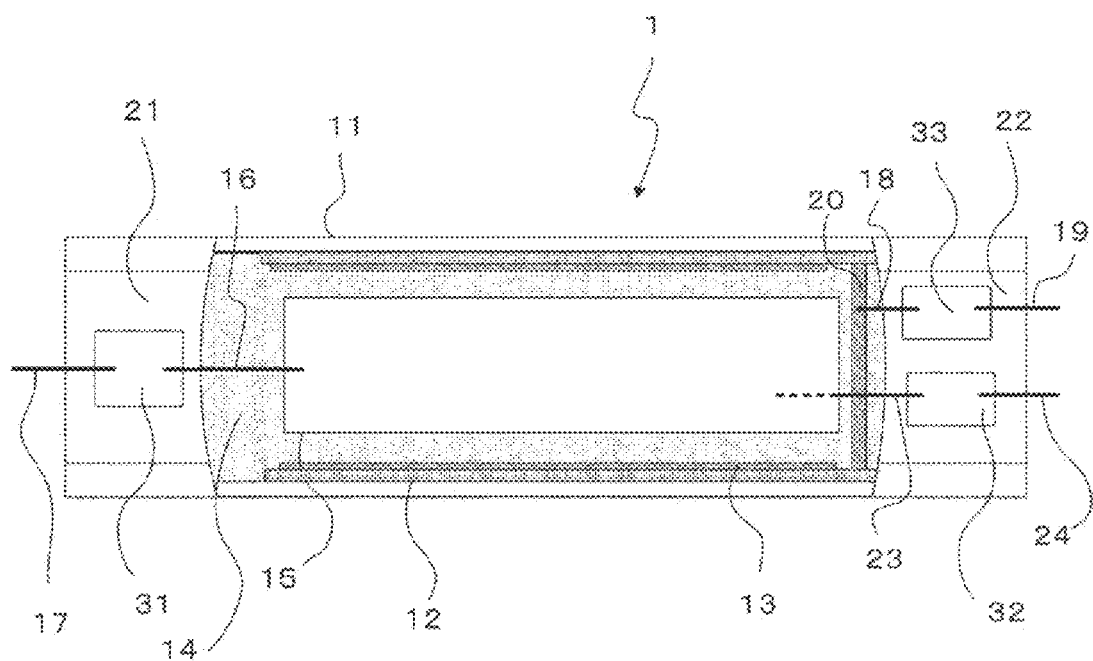
FIG. 1 is a cross-sectional view of a dye-sensitized solar cell of a first embodiment of the present invention taken along a direction of a tube axis.

Referring now to the drawings, a first embodiment of the present invention will be described.

FIG. 1 illustrates a cross-sectional view of a dye-sensitized solar cell of the present invention taken along a direction of a tube axis.

A solar cell 1 includes a tube-shaped vessel 11. The tube-shaped vessel 11 includes a collective electrode 12 and a photoelectrode 13 provided inward in this sequence on an inner surface thereof.

The tube-shaped vessel 11 is provided at a center thereof with a counter electrode 15 arranged along the longitudinal direction of the tube-shaped vessel 11 in a state of being apart from the photoelectrode 13.

The tube-shaped vessel 11 is sealed at both ends thereof and is filled with an electrolytic solution 14 therein, and is hermetically closed.

Configurations of respective parts will be described below.

The tube-shaped vessel 11 is formed of a translucent material, which is transparent glass. The cross-sectional shape of the tube-shaped vessel 11 may have any shape such as a circular shape, an oval shape, and a square shape.

A recommended type of the transparent glass which constitutes the tube-shaped vessel 11 is the type which allows easy transmission of solar light, and quartz glass or soda glass is preferably used.

The collective electrode 12 having a light-transmitting function over the entire circumference is arranged on an inner peripheral surface of the tube-shaped vessel 11. The collective electrode 12 may be formed of a metallic member, for example, a metallic mesh or a metal foil formed with holes for light transmission.

Apart from metallic members, a transparent conductive film may be used. Examples of the transparent conductive film which is preferably used include a thin film formed of a metallic oxidation product such as indium (In)—tin (Sn)

composite oxidation product (ITO), zinc oxide (ZnO), tin oxide (including a substance obtained by doping fluorine (FTO)). The transparent conductive film may be composed of two or more substances in combination thereof.

The photoelectrode 13 configured to photoelectrically converting solar light is provided on the collective electrode 12, and the collective electrode 12 and the photoelectrode 13 are electrically connected and are the same electrodes in terms of an electric circuit. The photoelectrode 13 is a semiconductor layer on which a sensitizing dye is adsorbed, and has a role for receiving electrons from the sensitizing dye excited upon reception of light by the semiconductor layer.

The semiconductor layer is, for example, a porous thin film formed by accumulating semiconductor fine particles formed of metallic oxidation product or metallic sulfide.

Examples of the metallic oxidation product which may be used for forming a semiconductor layer include, for example, titanic oxide, tin oxide, zinc oxide, niobium oxide, tantalum oxide, or zirconium oxide. Alternatively, a composite oxidation product such as strontium titanate, calcium titanate, or barium titanate may be used.

Examples of metallic sulfide which is used for forming the semiconductor layer include zinc sulfide, lead sulfide, or bismuth sulfide.

A porous semiconductor layer formed of a porous thin film may be prepared by applying paste containing fine particles of the metallic oxidation product or the metallic sulfide on the surface of the transparent conductive film or the metallic member which serves as a collective electrode 12 and baking the same.

Examples of a method of applying the paste which may be used include, for example, Screen Printing method, Doctor Blade method, and Squeegee method.

In addition, the semiconductor layer formed of the porous thin film may be prepared also by, for example, a Sol-Gel method, or Spatter method.

The sensitizing dye to be adsorbed by the semiconductor layer is a metallic complex or a dye such as organic dye configured to have absorbing in a visible light area and, in addition to it, an infrared light area.

Examples of the metallic complex which may be used include, for example, metallic phthalocyanine such as copper phthalocyanine, or titanylphthalocyanine, chlorophyl, or its derivative, hemin, and ruthenium, osmium, iron, or complex of zinc.

Examples of the organic dye which may be used include, for example, metal free phthalocyanine, cyanin system dye, metalocyanine system dye, xanthene system dye, triphenylmethane system dye, phthalocyanine system dye, naphthalocyanine system dye, phthalo/naphthalo-mixed phthalocyanine system dye, dipyridyl ruthenium complex dye, terpyridyl ruthenium complex dye, phenanthroline ruthenium complex dye, phenylxanthene dye, triphenylmethane dye, coumalin dye, acridine dye, or asso metallic complex dye.

The sensitizing dye is attached to the surface of the above-described porous semiconductor layer. The form of attachment may be of any form, such as chemical adsorption, physical adsorption, or deposition.

Examples of the method of causing attachment include, for example, a method of immersing the above-described porous thin film into solution containing a sensitizing dye and heating the same.

The electrolytic solution 14 is a so-called redox system electrolyte solution, and one containing an oxidant and a reductant is used.

The reductant provides electrons to a dye after having lost electrons and hence becomes an oxidant, and then receives electrons from the counter electrode 15, and hence returns back to the reductant again.

Specifically, the electrolytic solution obtained by dissolving $I^-/I^{3-}$ system, $Br^-/Br^{3-}$ system, or quinone-/hydroquinone system redox electrolyte into electrochemically inactive solvent such as acetonitrile, carbonate propylene, ethylene carbonate and the like, or a mixed solvent thereof may be used.

Examples of the $I^-/I^{3-}$ system electrolytic solution which may be used as an electrolysis include, for example, ammonium salt of iodine or a mixture of lithium iodide and iodine. Alternatively, an ionic electrolysis which does not contain iodine may be concurrently used.

The surface of the counter electrode 15 facing the photoelectrode 13 may be formed of, for example, white gold, or a conductive material formed with a white gold thin film on the surface thereof, or a catalyst layer formed of a thin film of a conductive material such as rhodium, ruthenium, ruthenium oxide, or carbon. These conductive materials have a catalytic ability which causes a reductive reaction of the electrolytic solution to be performed at a sufficient speed, and hence are preferable.

Glass sealed portions 21, 22 at both ends of the tube-shaped vessel 11 are formed by fusing and deforming the both ends of glass which constitutes the tube-shaped vessel 11.

The glass sealed portions 21, 22 are formed, for example by heating the both end portions of the tube-shaped vessel 11 adequately by a burner or the like, and fusing and softening a part thereof, and collapsing the both end portions from top and bottom. The collapsed glass sealed portions 21, 22 are molded into a flat shape.

In FIG. 1, the left end portion of the tube-shaped vessel 11 of a paper plane corresponds to the glass sealed portion 21 from which an external lead 17 connected to the counter electrode 15 is drawn out, and the right end portion of a paper plane corresponds to the glass sealed portion 22 from which an external lead 19 connected to the photoelectrode 13 (the collective electrode 12) and an external lead 24 connected to a polarized electrode (not illustrated) are drawn out.

The glass sealed portions 21, 22 do not have a configuration of a cover using a separate member for sealing, but are in a state in which the glass is softened and processed at the ends of the tube-shaped vessel 11 so that openings of the end portions are fused, solidified, and closed. Therefore, gap is hardly created at the sealed portions, and hence leakage of the liquid is avoided because the hermeticity is high.

In the interior of the glass sealed portion 21, the metal foil 31 is embedded, and the internal lead 16 extending from the interior of the tube-shaped vessel 11 and connected to the left end of the counter electrode 15 is joined to the surface on the right side by welding or the like.

The external lead 17 projecting outward from the tube-shaped vessel 11 is also joined to the left side of the metal foil 31 by welding or the like.

Electric connection between the inside and the outside of the glass sealed portion 21 of the tube-shaped vessel 11 is achieved via a metal foil 31. This is for preventing the glass sealed portion 21 from cracking or the like due to a thermal stress generated in the process of cooling after having sealed because the difference of a coefficient of thermal expansion between glass and metal is large. The metal foil 31 alleviates a thermal stress generated in the course of cooling after having sealed by absorbing the same by plastic deformation thereof.

Without using the metal foil 31, the external lead 17 does not impact on the hermeticity of seal as long as it is a thin metallic wire such as those having a diameter of 0.3 mm or smaller.

Metal foils 32, 33 are also embedded into the glass sealed portion 22.

The internal lead 18 connected to the photoelectrode 13 (the collective electrode 12) via the collector member 20 and the external lead 19 are joined to the metal foil 33 by welding or the like.

The internal lead 23 connected to a polarized electrode (not illustrated) and the external lead 24 are joined to the metal foil 32 by welding or the like.

Here, unlike the internal lead 18, the metal foil 33, and the external lead 19, the internal lead 23, the metal foil 32, and the external lead 24, being power supplying members connected to electrodes different from each other and hence required to be insulated, are arranged apart from each other in the glass sealed portion 22.

In FIG. 1, the internal lead 23 and the collector member 20 appear to be in contact, but are apart from each other so as to be insulated.

Figure 2:
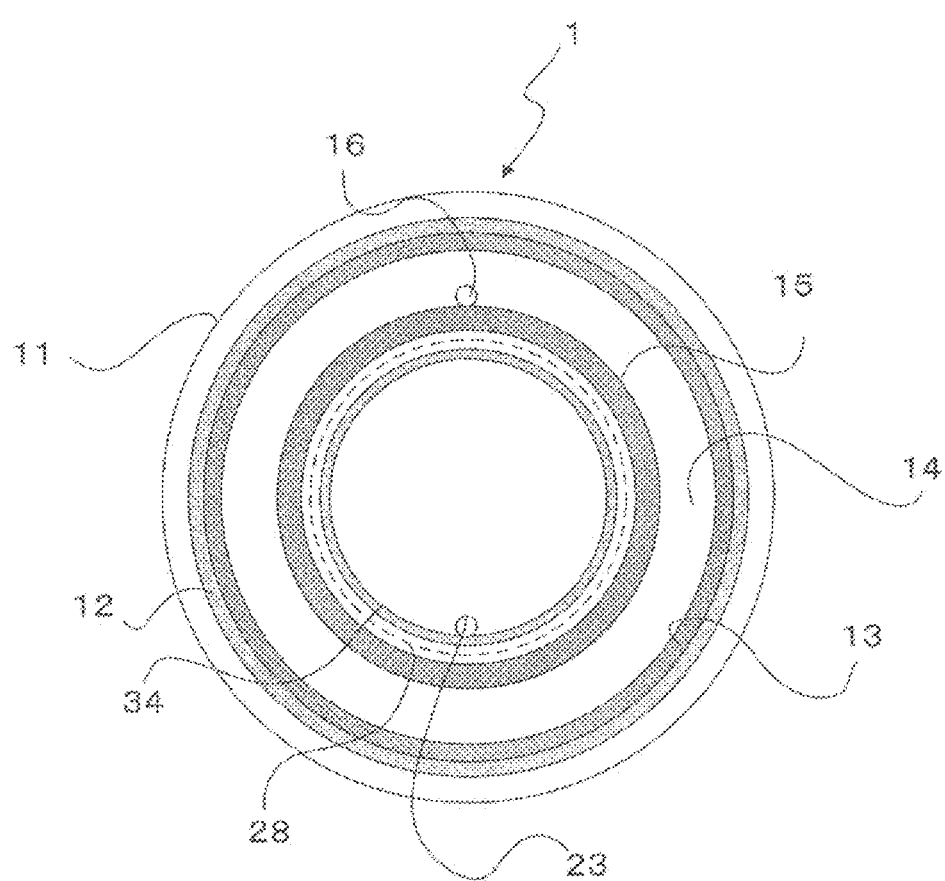
FIG. 2 is a cross-sectional view of a dye-sensitized solar cell of the first embodiment of the present invention taken along a plane vertical to the tube axis.

FIG. 2 is a cross-sectional view of a dye-sensitized solar cell of the present invention taken along a plane vertical to the tube axis.

As illustrated in this drawing, the tube-shaped vessel 11 is a circular tube-shaped vessel having a circular cross section in the longitudinal direction, and the collective electrode 12 and the photoelectrode 13 are formed along the inner surface thereof. In this structure, lowering of the power generation efficiency due to the impact of a change in incident angle in association with the movement of the sun cannot be occurred easily.

The solar cell is generally installed into a flat shape within a limited surface area except for the solar cells which transmit light by themselves, the surface area of the solar cell corresponds to the light-receiving surface area. From this view point, if the tube-shaped vessel 11 is formed into a circular tube shape as in the present invention, the surface area of the solar cell is more increased than a case where the flat-shaped tubular vessel is used, and the surface area of the photoelectrode formed on the inner surface or the tube-shaped vessel 11 is also increased, so that the power generating amount is increased.

In the tube-shaped vessel 11, the counter electrode 15 and the photoelectrode 13 are arranged at a slight distance therebetween, and the counter electrode 15 has a shape having an arcuate shaped portion as illustrated in FIG. 2.

Although the counter electrode 15 having a cylindrical shape is illustrated in the drawing, shapes having other arcuate-shaped portions such as a C-shape in cross section or a spiral shape are also applicable as long as being a slight distant apart from the photoelectrode 13.

An electric double-layer capacitor composed of the separator 28, the negative polarized electrode 34, and the counter electrode 15 which also serves as a positive polarized electrode is provided on the inside of the cylindrical counter electrode 15. Although this will be described later, the electric double-layer capacitor is more increased in surface area by having an arcuate-shaped portion than a case having a flat shape, and is increased in power storage amount by an increase in capacity.

Figure 3:
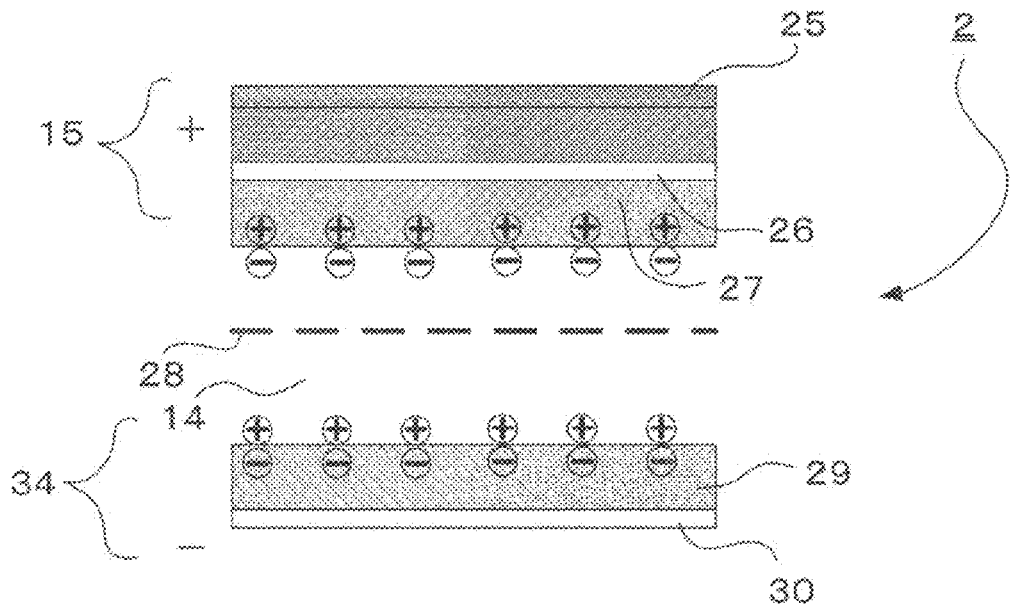
FIG. 3 is a cross-sectional view illustrating a structure of an electric double-layer capacitor of the present invention.

FIG. 3 is a cross-sectional view illustrating a configuration of the electric double-layer capacitor formed on the inside of the counter electrode.

The electric double-layer capacitor 2 includes the counter electrode 15 which also serves as a positive polarized electrode, the separator 28, and the negative polarized electrode 34, and the electrolytic solution 14.

A catalyst layer 25 composed of above-described Pt or the like is formed on the outside of the counter electrode 15, and constitutes part of the solar cell 1. In other words, in the counter electrode 15 which also serves as a positive polarized electrode, the catalyst layer 25 functions as a counter electrode of the photoelectrode 13 in the solar cell 1.

In contrast, a collector layer 26 formed for example, of aluminum is formed on the inside of the counter electrode 15, and a polarized electrode layer 27 formed of carbon or the like is formed on an inner surface thereof, so that a positive polarized electrode is formed. In other words, in the counter electrode 15 which also serves as a positive polarized electrode, the collector layer 26 and the polarized electrode layer 27 function as positive polarized electrodes in the electric double-layer capacitor 2.

It is also possible to form the counter electrode 15 of carbon to use as a common electrode with the positive polarized electrode. In other words, by forming the counter electrode 15 of carbon, the counter electrode 15 may have a configuration having no layer structure, so that a catalyst layer which functions as a counter electrode of the photoelectrode 13, and a collector layer and a polarized electrode layer which function as positive polarized electrodes in the electric double-layer capacitor do not have to be provided separately in the solar cell 1.

On the inside of the polarized electrode layer 27, the negative polarized electrode 34 is arranged apart therefrom, and the separator 28 is arranged and the electrolytic solution 14 is filled between the both.

The negative polarized electrode 34 is composed of a collector layer 30 formed of, for example, aluminum, and a polarized electrode layer 29 formed of, for example, carbon formed on the surface thereof in the same manner as the positive polarized electrode.

The separator 28 is nonwoven paper or a porous resin sheet, and has a role to electrically insulate the polarized electrodes from each other and lower an internal resistance of the capacitor.

The main references when selecting the separator are (1) being as thin as possible for reducing the internal resistance, (2) simultaneously, having a density as low as possible, (3) having good wettability with respect to an electrolytic solution, (4) being stable with respect to an electrolytic solution, (5) not including impurities which may cause oxidation-reduction reaction, and (6) being superior in thermal stability.

As a specific example, a configuration including polyolefin and inorganic filler manufactured by Nippon Sheet Glass Co. Ltd. having a thickness between 40 and 110 μm, a porosity of 40 to 80%, a transmitting amount from 20000 to 100 sec/100 cc, and a maximum diameter of 1 μm or smaller (average 0.1 μm) is preferably employed.

The pair of polarized electrode layers (specifically, a positive polarized electrode including the collector layer 26 and the polarized electrode layer 27 of the counter electrode 15, and the negative polarized electrode 34) and the separator 28 are formed on the inside of the catalyst layer 25 of the counter electrode 15. Therefore, if the tube-shaped vessel is filled with the electrolytic solution 14, the electrolytic solution 14 is also filled between the pair of the polarized electrodes, so that the electric double-layer capacitor 2 is formed.

The electric double-layer capacitor 2 stores and supply power in a manner described below.

Figure 4:
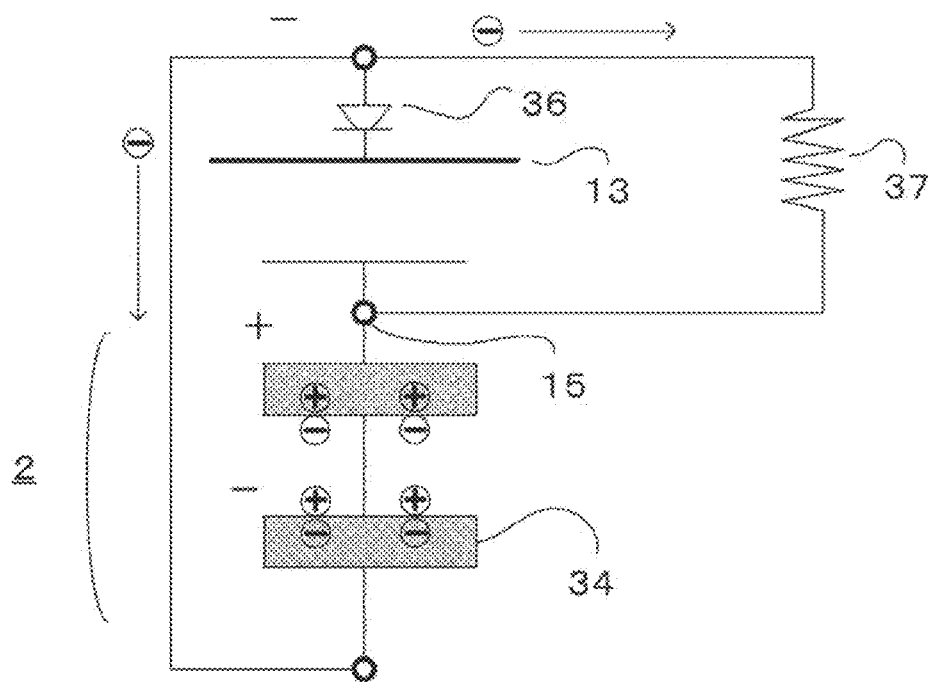
FIG. 4 is a drawing for explaining power storage of the electric double-layer capacitor of the present invention.

In a drawing illustrated in FIG. 4, the positive polarized electrode has the same potential as the catalyst layer 25 functioning as the counter electrode of the photoelectrode 13 in the counter electrode 15, and is a common electrode with the counter electrode of the photoelectrode 13 of the solar cell 1. In contrast, the negative polarized electrode 34 is connected to the photoelectrode 13.

A rectifier element 36 configured to prevent the movement of the electrons from the negative polarized electrode 34 to the photoelectrode 13 is provided between the photoelectrode 13 and the negative polarized electrode 34. A switch for turning On and Off may be provided instead of the rectifier element 36. Accordingly, a power storage loss is alleviated.

When the solar cell 1 receives light, electrons generated from the photoelectrode 13 move to the negative polarized electrode 34. Consequently, a layer of cation is formed on the surface of the negative polarized electrode 34. Then, a layer of anion is formed on the surface of the positive polarized electrode, whereby the electric double layer is formed. Accordingly, the solar cell 1 generates power and power is stored between the pair of polarized electrodes.

Figure 5:
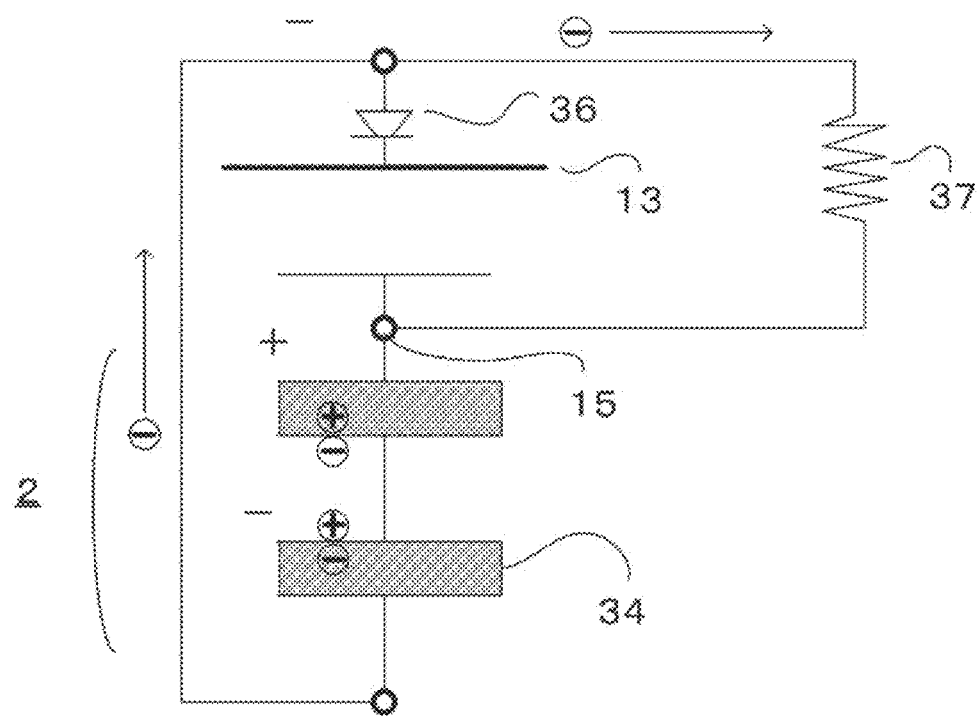
FIG. 5 is a drawing for explaining power discharge of the electric double-layer capacitor of the present invention.

In contrast, when the solar cell 1 does not receive light and does not generate power as illustrated in FIG. 5, the electric double-layer capacitor 2 discharges and power is supplied to a load 37.

As described above, the dye-sensitized solar cell (the solar cell 1) of the present invention has the power storage function in the interior of the counter electrode 15, and hence is capable of supplying power even when no light is received.

In addition, since the sealed portions of the tube-shaped vessel 11 are formed of glass, deterioration due to UV ray does not occur and leakage of the electrolytic solution 14 does not occur.

Accordingly, a dye-sensitized solar cell having a reliable sealed portion having a power storage function in a simple and compact structure, and simultaneously, having no probability of leakage of the electrolytic solution is provided.

Since the solar cell 1 is formed of the cylindrical tube-shaped vessel 11, the surface areas of the photoelectrode 13 and the polarized electrode of the electric double-layer capacitor 2 of the solar cell 1 may be increased, and hence the efficiencies of power generation and power storage may be increased.

Since the photoelectrode 13 is provided along the inner surface of the cylindrical tube-shaped vessel 11, even when the angle of incident of light associated with the movement of the sun is changed, the power generation efficiency can hardly be lowered.

In addition, since the electric double-layer capacitor 2 is provided in a space formed on the inside of the cylindrical counter electrode 15, a space in the tube-shaped vessel 11 can be utilized effectively, and the power storage apparatus does not have to be provided separately.

As described thus far, the power generating function and the power storage function of the dye-sensitized solar cell of the present invention have been described, and in the following description, a second embodiment, a third embodiment, and a fourth embodiment, which are applications of the power storage function, will be described.

The electric double-layer capacitor of the first embodiment of the present invention which has been described above have a monolayer structure, while the electric double-layer capacitors of the second embodiment, the third embodiment, and the fourth embodiment have a multilayer structure.

The multilayer electric double-layer capacitor of the second embodiment, the third embodiment, and the fourth embodiment is configured to increase the surface area of the capacitor for power storage and improve the power storage efficiency by employing a multilayer structure instead of the monolayer structure in addition to the effects obtained by the first embodiment as effects of the present invention.

Figure 6:
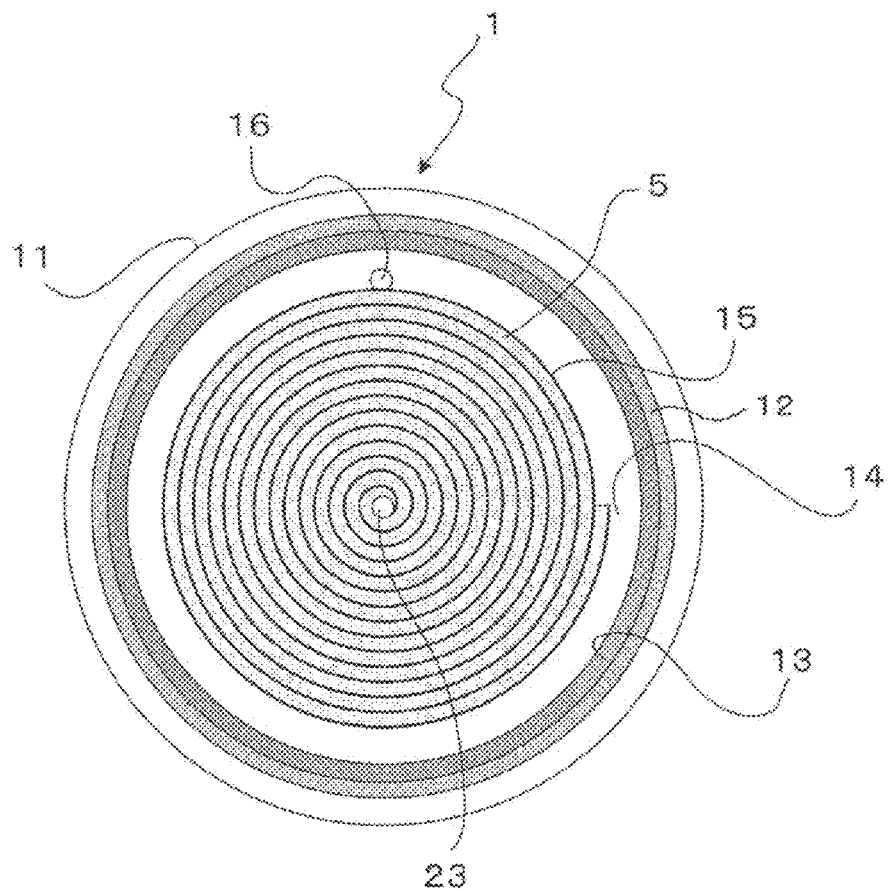
FIG. 6 is a cross-sectional view of a dye-sensitized solar cell of a second embodiment of the present invention taken along a plane vertical to the tube axis.

FIG. 6 shows a cross-section orthogonal to a tube axis of the dye-sensitized solar cell of the second embodiment.

In this drawing, the glass made tube-shaped vessel 11 is formed with a layer of the photoelectrode 13 over the entire inner surface thereof, and a band-shaped laminated sheet 50 is wound on the inside of the layer of the photoelectrode 13 without a core, thereby forming a roll body 5. The internal leads 16, 23 have the same as those of the first embodiment. In other words, the internal lead 16 is electrically connected to the counter electrode 15 which also serves as a positive polarized electrode, and the internal lead 23 is electrically connected to the negative polarized electrode.

One end of the laminated sheet 50 is located on an outer surface of the roll body 5, and the other end is located at a substantially center of the roll body. Although described later, an outermost layer (an outermost electrode portion 510) of the laminated sheet 50 projects more than one end portion of other compositional layers of the laminated sheet 50 and extends so as to cover one turn or more of an outer surface of the wound member composed of other compositional layers of the roll body 5 (not illustrated) only in the second embodiment. It is because a layer functioning as a counter electrode is formed on an outermost layer of the roll body 5.

Figure 7:
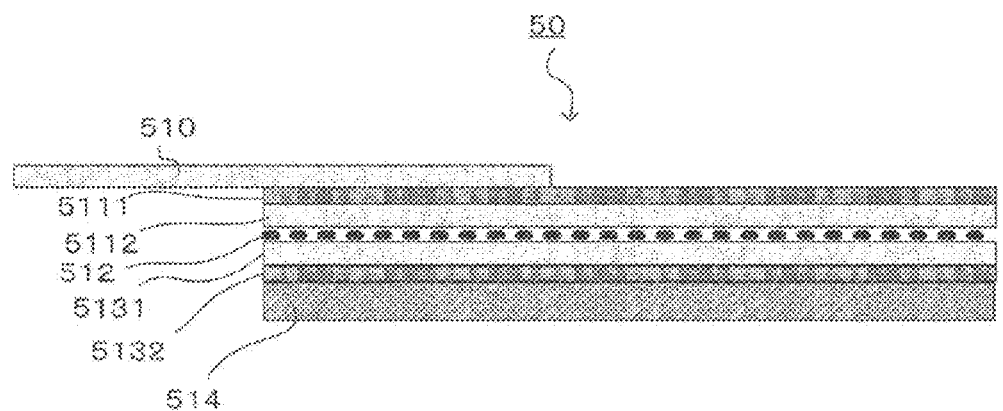
FIG. 7 is a cross-sectional view of a laminated sheet of the second embodiment of the present invention.
Figure 8:
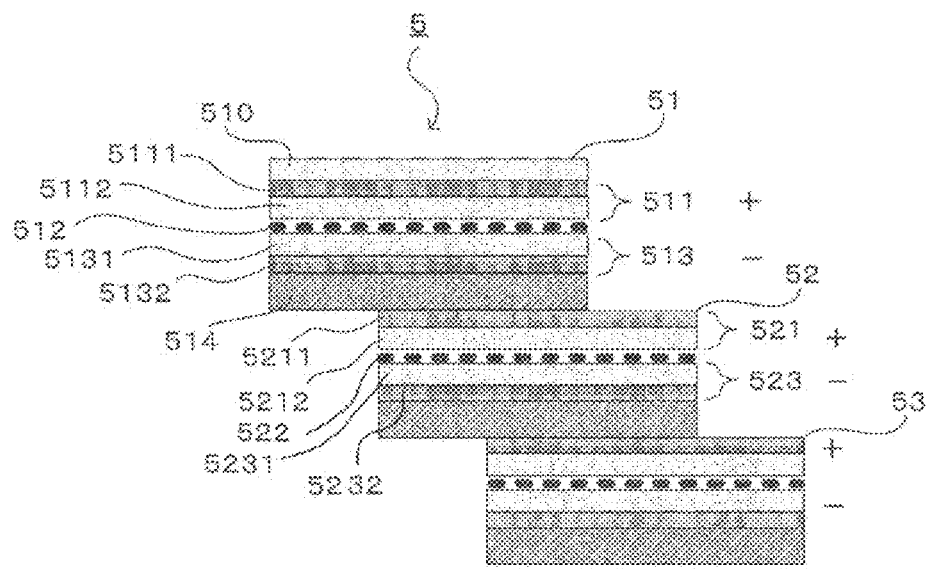
FIG. 8 is a cross-sectional view of a roll body of the second embodiment of the present invention.

FIG. 7 is a cross-sectional view for explaining the structure of the laminated sheet 50, and FIG. 8 is a cross-sectional view illustrating a multilayer structure of the laminated sheet 50 wound so as to form the roll body 5.

In FIG. 7, the laminated sheet 50 is composed of an outermost electrode portion 510, a first collector layer 5111, a first polarized electrode layer 5112, a separator 512, a second polarized electrode layer 5131, a second collector layer 5132, and an insulating layer 514.

In this laminated sheet 50, a layer forming the counter electrode which also serves as a positive polarized electrode is formed by the outermost electrode portion 510, the first collector layer 5111, and the first polarized electrode layer 5112, and a layer forming the negative polarized electrode is formed by the second polarized electrode layer 5131 and a second collector layer 5132.

Here, the outermost electrode portion 510 has a length sufficient for covering the outer surface of the wound member formed of other compositional layers of the roll body 5 by one turn or more. However, a portion from the second turn onward, being unnecessary, is not formed.

Examples of a specific material that forms the outermost electrode portion 510, the first polarized electrode layer 5112, and the second polarized electrode layer 5131 include, for example, a film formed of carbon in a broad sense, and includes a film formed with allotropes of carbon such as graphite, carbon nanotube, and fullerene on the surface thereof. Examples of material other than the film formed of carbon include a film formed of conductive polymeric molecule (conductive polymer), and the conductive polymeric molecule (conductive polymer) includes, for example, polypyrrole, polythiophene, polyacetylene, and polyaniline.

Examples of a specific material that forms the first collector layer 5111 and the second collector layer 5132 include, metals, for example, aluminum, and titanium. When titanium is used, superior corrosion resistance property is expected.

A laminated body of the collector layer and the polarized electrode layer may be formed, for example, by forming a film by spraying carbon particles onto a metal foil such as aluminum or the like.

When the roll body 5 is formed from the laminated sheet 50, since opposed surface areas of an outer periphery and an inner periphery are different, a process of reducing the film thickness of a carbon film or a conductive polymeric molecule (conductive polymer) film, which corresponds to the polarized electrode layer, from the outside toward the inside of the laminated sheet 50 to be wound is performed.

A substance which constitutes the insulating layer 514 is an insulating material, a dielectric substance, or a gap (space).

Specific examples of the insulating material which constitutes the insulating layer 514 include, for example, PET (polyethylene terephthalate), PTFE (polytetrafluoroethylene), or a high molecular film such as polyimide or an insulating paper such as aramid paper.

Specific examples of a dielectric substance which constitutes the insulating layer 514 include a thin film sheet coated with a dielectric material such as $SiO_2$ or $TiO_2$.

In FIG. 8, the laminated sheet 50 that forms the roll body 5 constitute wound layers of a first turn 51, a second turn 52, ... and $n^{th}$ turn ($n \geq 1$, and n is natural numbers).

In the same figure, since the roll body 5 is immersed in the electrolytic solution 14, part between the respective wound layers is filled with electrolyte as being filled with the electrolytic solution 14, and the layer of the separator 512 in the laminated sheet 50 is also filled with the electrolytic solution 14.

For the sake of convenience in description of the drawing, the first turn 51, the second turn 52, and the third turn 53 are illustrated as being displaced.

The electrolytic solution filled between the wound layers of the roll body 5 and the separator 512 is the same as the electrolytic solution 14 filed in the tube-shaped vessel 11.

The electrolytic solution to be filled in the laminated sheet 50 may be that containing electrolyte different from that of the electrolytic solution 14 filled in the tube-shaped vessel 11, specifically that containing electrolyte for power storage as the electrolyte. It is because that the power generation using the solar light is not performed in the laminated sheet 50, and hence filling with the electrolytic solution containing electrolyte more suitable for power storage instead of the electrolytic solution 14, which is a redox solution having a redox pair is preferable.

Examples of the electrolyte for power storage which may be used include, for example, electrolyte including anion such as $ClO_4^-$, $BF_4^-$, $NO_3^-$, $PF_6^-$, $CF_3O_3^-$. With the electrolyte as described above, the surface area of the electrical double layer to be formed increased by an amount corresponding to the content of the anion, so that an advantage of an increase in the maximum power storage capacity is achieved.

In order to fill the laminated sheet 50 with an electrolytic solution different from the electrolytic solution 14 filled in the tube-shaped vessel 11, a method of inserting a substance (a gelatinous electrolyte) containing a concrete-state, for example, gelatinous electrolytic solution between the first polarized electrode layer 5112 and the second polarized electrode layer 5131 is contemplated.

Subsequently, when focusing only on the first turn 51, a portion from the first collector layer 5111 to the first polarized electrode layer 5112 corresponds to the positive first polarized electrode 511. A portion from the outermost electrode portion 510 to the first polarized electrode layer 5112 corresponds to the counter electrode 15 which also serves as a positive polarized electrode.

A portion from a second polarized electrode layer 5131 to a second collector layer 5132 with the separator 512 interposed therebetween corresponds to a negative second polarized electrode 513.

In this structure, an electric double-layer capacitor is formed between the first polarized electrode 511 and the second polarized electrode 513, and power is stored therein.

In contrast, when focusing only on the second turn 52, a portion from the first collector layer 5211 to the first polarized electrode layer 5212 corresponds to a positive first polarized electrode 521.

A portion from a second polarized electrode layer 5231 to a second collector layer 5232 with the separator 522 interposed therebetween corresponds to a negative second polarized electrode 523.

In this structure, in the same manner as the first turn 51, an electric double-layer capacitor is formed between the first polarized electrode 521 and the second polarized electrode 523, and power is stored therein.

In this manner, since the roll body 5 itself is a wound band-shaped member, the second turn 52, the third turn 53, ... $n^{th}$ turn are also the same member continuing therefrom, and basically have the same power storage function of the electric double-layer capacitor as the first turn 51.

Therefore, in comparison with a case where a monolayer electric double-layer capacitor is formed, since the surface area of the electric double-layer capacitor can be dramatically increased by effectively using the space which is formed on the inside of the counter electrode 15 which also serves as a positive polarized electrode by employing a multi-layer structure in the electric double-layer capacitor by forming the roll body 5 with the laminated sheet 50, the power storage function is extremely improved.

Furthermore, since the second collector layer 5132 of the first turn 51 has a negative polarity and the first collector layer 5211 of the second turn 52 which is positioned with a gap or the insulating layer 514 as the dielectric substance interposed therebetween has a positive polarity, a portion between the second collector layer 5132 and the first collector layer 5211 also functions as a capacitor and power is stored therein.

Figure 9:
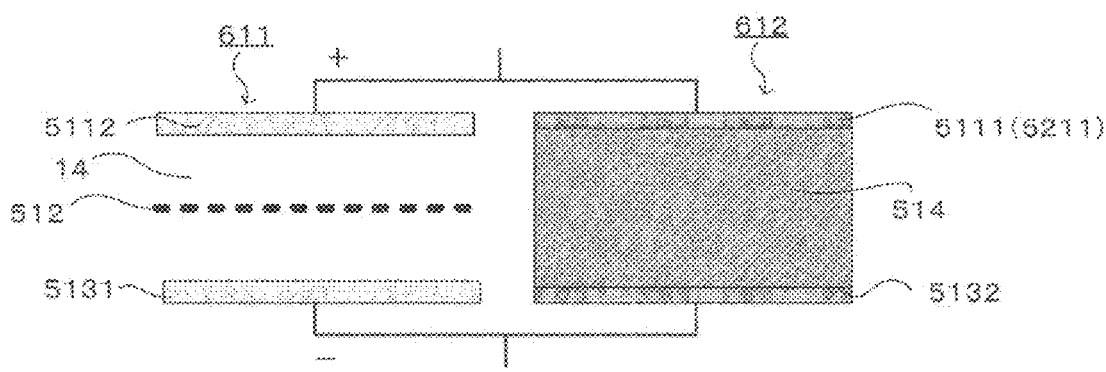
FIG. 9 is a schematic diagram illustrating an electric double-layer capacitor of the second embodiment of the present invention.

FIG. 9 is a schematic diagram illustrating the electric double-layer capacitor formed in the first turn 51 and a capacitor formed between the second collector layer 5132 and the first collector layer 5211 in a form of an analogous circuit.

In this drawing, the electric double-layer capacitor formed in the first turn 51 is defined as a first capacitor 611, and the capacitor formed between the first turn 51 and the second turn 52 is defined as a second capacitor 612.

The second polarized electrode layer 5131 of the first turn 51 and the second collector layer 5132 of the first turn 51 are in physical contact with each other and hence are electrically connected, and are in a relationship which can be considered as having the same potential.

When referring to the multilayer structure, the first collector layer 5211 of the second turn 52 (the first collector layer 5111 of the first turn 51 is the same member) and the first polarized electrode layer 5112 of the first turn 51 are also in a relationship which can be considered as having the same potential.

Therefore, the first capacitor 611 of the first turn 51 and the second capacitor 612 formed between the first turn 51 and the second turn 52 are in a parallel relationship as illustrated.

In addition, since the roll body 5 is formed to the $n^{th}$ turn as illustrated in FIG. 8, not only the relationship between the first turn 51 and the second turn 52, but also the relationship between the $n^{th}$ turn ($n \geq 1$) and the $n+1^{th}$ turn can be said to be the same, it can be said that the first capacitor formed between the positive polarized electrode and the negative polarized electrode of $n^{th}$ turn of the roll body and the second capacitor formed between the negative polarized electrode of the $n^{th}$ turn and the positive polarized electrode of the n+1$^{th}$ turn are in a relationship parallel to each other. An end of the laminated sheet 50 at a center of the roll body 5 is excluded since the next turn layer does not exist.

In other words, in this embodiment, not only the surface area of the polarized electrode is simply increased by employing the multilayer structure in the electric double-layer capacitor by winding the laminated sheet 50, but also the practical surface area of the capacitor is increased by forming the new second capacitor 612 in parallel relationship with the first capacitor 611, whereby the electric capacity is dramatically improved. Accordingly, the power storage efficiency is improved more than that of the first embodiment.

Subsequently, a third embodiment similar to the second embodiment will be described.

In the following description, only the layer structure of the laminated sheet, which is a different point of the third embodiment from the second embodiment, and the multilayer structure when the roll body is formed will be described, and description of parts overlapped with the second embodiment will be omitted.

Figure 10:
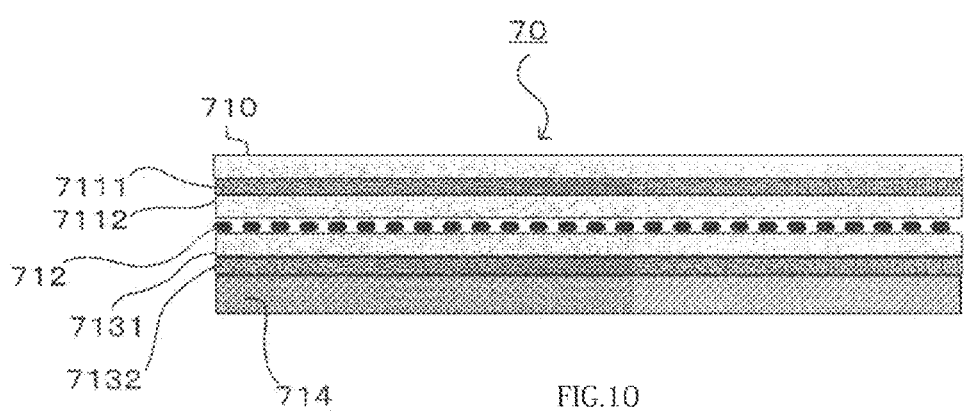
FIG. 10 is a cross-sectional view of a laminated sheet of a third embodiment of the present invention.
Figure 11:
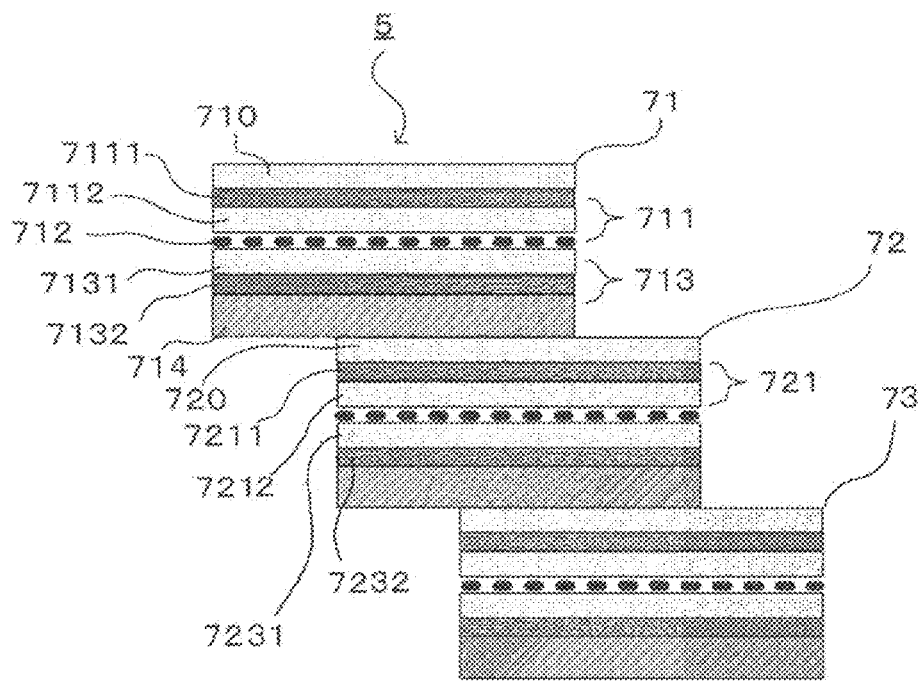
FIG. 11 is a cross-sectional view of a roll body of the third embodiment of the present invention.

FIG. 10 is a cross-sectional view for explaining the layer structure of a laminated sheet 70, and FIG. 11 is a cross-sectional view illustrating a multilayer structure of the laminated sheet 70 wound so as to form the roll body.

In FIG. 10, the laminated sheet 70 is composed of an outermost polarized electrode layer 710 which also has functions of a counter electrode and a polarized electrode, a first collector layer 7111, a first polarized electrode layer 7112, a separator 712, a second polarized electrode layer 7131, a second collector layer 7132, and an insulating layer 714.

In this laminated sheet 70, a layer forming the counter electrode which also serves as a positive polarized electrode layer is formed by the outermost polarized electrode layer 710, the first collector layer 7111, and the first polarized electrode layer 7112, and a layer forming the negative polarized electrode is formed by a second polarized electrode layer 7131 and a second collector layer 7132.

In FIG. 11, reference numeral 711 denotes a positive first polarized electrode of a first turn 71, reference numeral 713 denotes a negative second polarized electrode of the first turn 71, reference numeral 721 denotes a positive first polarized electrode of a second turn 72, reference numeral 7212 denotes a first polarized electrode layer of the second turn 72, reference numeral 7231 denotes a second polarized electrode layer of the second turn 72, reference numeral 7232 denotes a second collector layer of the second turn 72, and reference numeral 73 of the roll body 5 denotes a third turn.

In this manner, a different portion of the third embodiment from the second embodiment is that the outermost polarized electrode layer 710 is formed over an entire portion of an upper surface of the laminated sheet 70.

Therefore, as illustrated in FIG. 11, when the roll body 5 is formed by the laminated sheet 70, what comes into abutment with the insulating layer 714 of the first turn 71 is not the first collector layer 7211 of the second turn 72, but the outermost polarized electrode layer 720 of the second turn 72. Portions other than this point are the same as the second embodiment.

In this embodiment, internal resistance is slightly increased by adding one layer of the polarized electrode layer in the turns other than the first turn in comparison with the second embodiment. However, since a specific layer for forming an outermost layer which functions as a counter electrode is provided on the laminated sheet for forming the roll body 5, the necessity to cover the outer surface of the wound member composed of other compositional layer of the roll body 5 is eliminated by that specific layer, so that another effect that the manufacture is facilitated is achieved.

Subsequently, the fourth embodiment will be described.

In the following description, only the layer structure of a laminated sheet 80 and the multiple layer structure when the roll body is formed will be described, and description of parts overlapped with the second embodiment and the third embodiment will be omitted.

Figure 12:
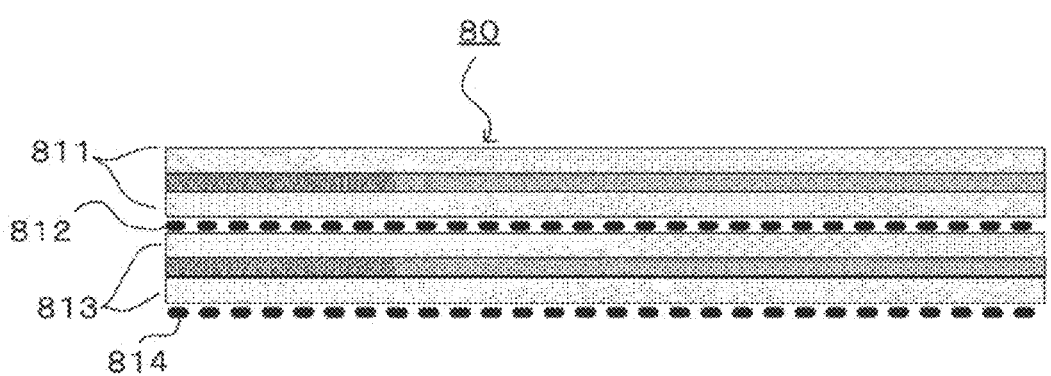
FIG. 12 is a cross-sectional view of a laminated sheet of a fourth embodiment of the present invention.
Figure 13:
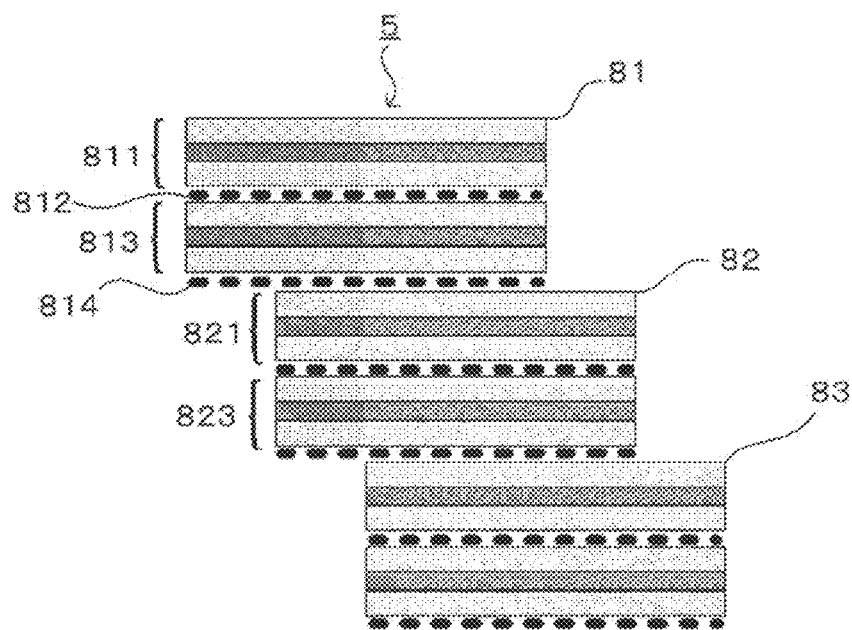
FIG. 13 is a cross-sectional view of a roll body of the fourth embodiment of the present invention.

FIG. 12 is a cross-sectional view for explaining the structure of the laminated sheet 80, and FIG. 13 is a cross-sectional view illustrating a multilayer structure of the laminated sheet 80 wound so as to form the roll body 5.

In FIG. 12, the laminated sheet 80 includes a first polarized electrode layer 811 having polarized electrode layers of carbon or the like formed on both surfaces of a collector such as aluminum or titanium, for example, a first separator 812, a second polarized electrode layer 813 formed with polarized electrode layers on both surfaces of the collector, and a second separator 814.

In this laminated sheet 80, the first polarized electrode layer 811 also have functions of a counter electrode and the polarized electrode layer, a layer forming the counter electrode which also serves as a positive polarized electrode is formed by the first polarized electrode layer 811, and a layer forming the negative polarized electrode is formed by a second polarized electrode layer 813.

In FIG. 13, the laminated sheet 80 that forms the roll body 5 constitute wound layers of a first turn 81, a second turn 82, . . . and n$^{th}$ turn. In the same figure, since the roll body 5 is immersed in the electrolytic solution 14, the first separator 812 and the second separator 814 are also filled with the electrolytic solution 14.

For the sake of convenience in description of the drawing, the first turn 81, the second turn 82, and the third turn 83 are illustrated as being displaced.

When focusing only on the first turn 81, an electric double-layer capacitor is formed between a first polarized electrode formed of the first polarized electrode layer 811 which also functions as a counter electrode and the polarized electrode and a second polarized electrode formed of the second polarized electrode layer 813, and power is stored therein.

Then, since the roll body 5 itself is a wound band-shaped member, the second turn 82, the third turn 83, . . . n$^{th}$ turn are also the same member continuing therefrom, and basically have the same power storage function as the first turn 81.

Therefore, in comparison with a case where a monolayer electric double-layer capacitor is formed, since the surface area of the electric double-layer capacitor can be dramatically increased by effectively using the space formed on the inside of the counter electrode which also serves as a positive polarized electrode by forming a multi-layer electric double-layer capacitor with the roll body 5, the power storage function is extremely improved.

Furthermore, the second polarized electrode formed of the second polarized electrode layer 813 of the first turn 81 has a negative polarity, and the first polarized electrode formed of the first polarized electrode layer 821 of the second turn 82 positioned with the intermediary of a space filled with the electrolytic solution in which the second separator 814 is inserted has a positive polarity, so that portion between the second polarized electrode and the first polarized electrode also functions as an electric double-layer capacitor and power is stored therein.

Figure 14:
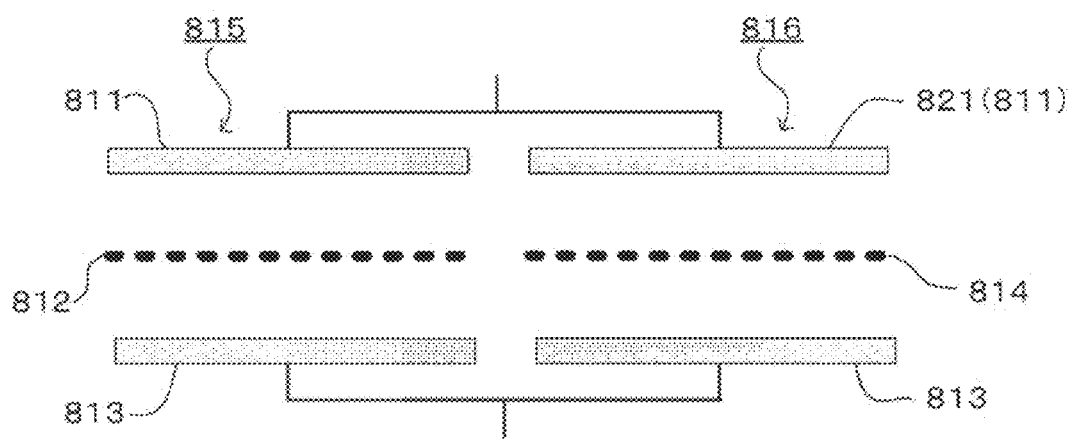
FIG. 14 is a schematic diagram illustrating an electric double-layer capacitor of the fourth embodiment of the present invention.
Figure 15:
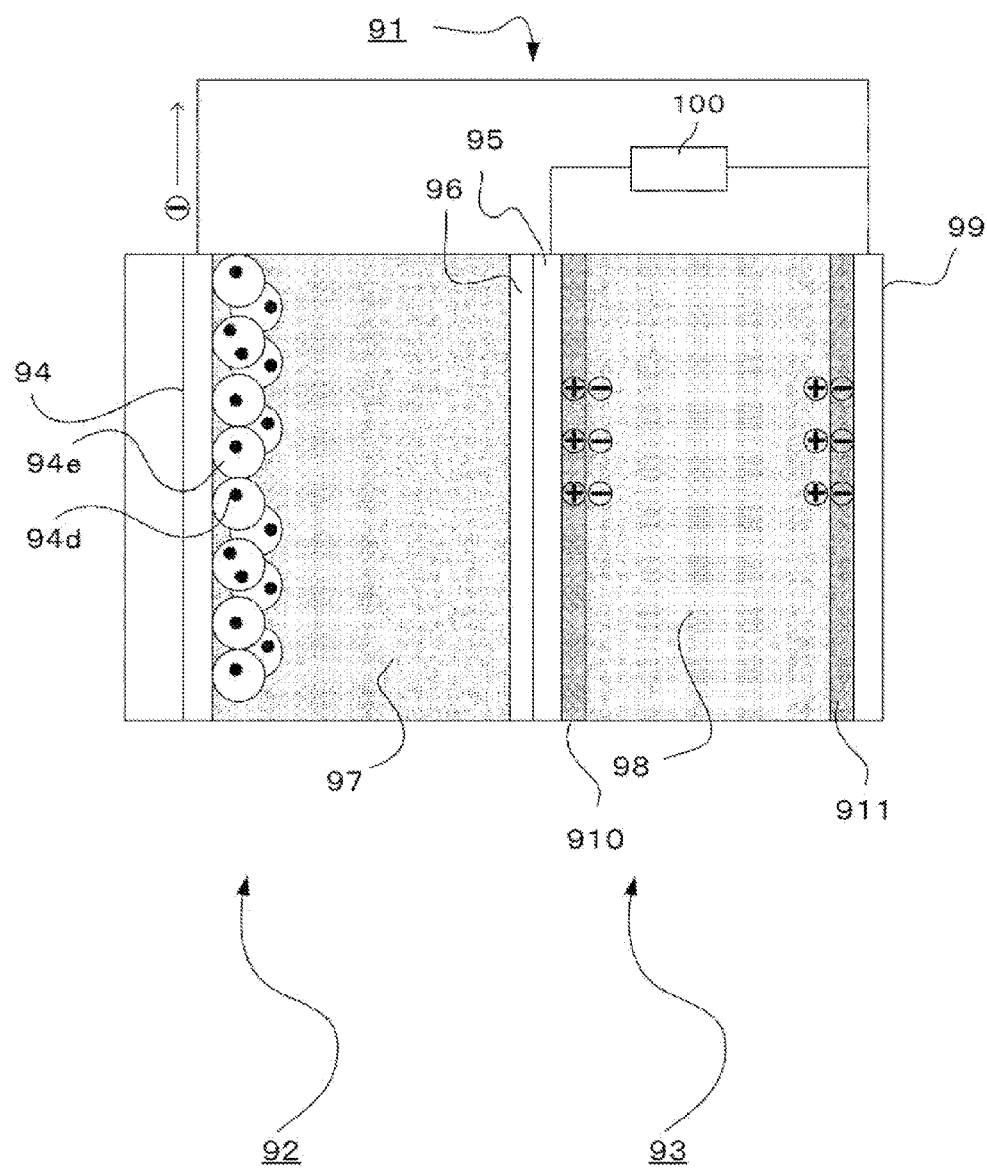
FIG. 15 is a drawing illustrating a dye-sensitized solar cell of the related art.

FIG. 14 is a schematic diagram illustrating the electric double-layer capacitor formed in the first turn 81 and a capacitor formed between the second polarized electrode of the first turn 81 and the first polarized electrode of the second turn 82 in a form of an analogous circuit.

Here, the electric double-layer capacitor formed in the first turn 81 is defined as a first electric double-layer capacitor 815, and the electric double-layer capacitor formed between the first turn 81 and the second turn 82 is defined as a second electric double-layer capacitor 816.

The second polarized electrode of the first turn 81 (the electrode formed of the second polarized electrode layer 813) opposing the first polarized electrode of the first turn 81 (the electrode formed of the first polarized electrode layer 811) and the second polarized electrode of the first turn (the electrode formed of the second polarized electrode layer 813) opposing the first polarized electrode of the second turn 82 (the electrode formed of the first polarized electrode layer 821) have the same polarity, and hence has the same potential. Also, the first polarized electrode of the second turn 82 (the electrode formed of the first polarized electrode layer 821) and the first polarized electrode of the first turn 81 (the electrode formed of the first polarized electrode layer 811) are formed of the continuous member, and hence has the same potential.

Therefore, the first electric double-layer capacitor 815 and the second electric double-layer capacitor 816 have the parallel relationship as illustrated.

In other words, in this embodiment, not only the surface area of the polarized electrode is simply increased by employing the multilayer structure in the electric double-layer capacitor by winding the laminated sheet 80, but also the practical surface area of the electric double-layer capacitor is increased by forming the second electric double-layer capacitor 861 in parallel relationship with the first electric double-layer capacitor 851, whereby the electric capacitor is dramatically improved. Accordingly, the power storage efficiency is improved more than that of the first embodiment.

As described thus far, the second embodiment, the third embodiment, and the fourth embodiment are applications of the first embodiment.

The first embodiment is characterized in that the electric double-layer capacitor is formed in the internal space of the tube-shaped vessels, specifically the space formed inside of the cylindrical counter electrode and power is stored therein. However, the second embodiment, the third embodiment, and the fourth embodiment are characterized in that the space formed on the inside of the counter electrode is further effectively utilized, so that the effect of improving the power storage efficiency is achieved.

REFERENCE SIGNS LIST

1 solar cell
11 tube-shaped vessel
12 collective electrode
13 photoelectrode
14 electrolytic solution
15 counter electrode
16 internal lead
17 external lead
18 internal lead
19 external lead
2 electric double-layer capacitor
20 collector member
21 glass sealed portion
22 glass sealed portion
23 internal lead
24 external lead
25 catalyst layer
26 collector layer
27 polarized electrode layer
28 separator
29 polarized electrode layer
30 collective electrode layer
31 metal foil
32 metal foil
33 metal foil
34 polarized electrode
36 rectifier element
37 load
5 roll body
50 laminated sheet
51 first turn
52 second turn
53 third turn
510 outermost electrode portion
5111 first collector layer
5112 first polarized electrode layer
511 first polarized electrode
512 separator
5131 second polarized electrode layer
5132 second collector layer
513 second polarized electrode
514 insulating layer
521 first polarized electrode
5231 second polarized electrode layer
5232 second collector layer
522 separator
523 second polarized electrode
611 first capacitor
612 second capacitor
5211 first collector layer
5212 first polarized electrode layer
70 laminated sheet
71 first turn
72 second turn
73 third turn
710 outermost polarized electrode layer
7111 first collector layer
7112 first polarized electrode layer
711 first polarized electrode
712 separator
7131 second polarized electrode layer
7132 second collector layer
713 second polarized electrode
714 insulating layer
7211 first collector layer
7212 first polarized electrode layer
720 outermost polarized electrode layer
721 first polarized electrode
7231 second polarized electrode layer
7232 second collector layer
80 laminated sheet
81 first turn
82 second turn
83 third turn
811 first polarized electrode layer
812 first separator
813 second polarized electrode layer
814 second separator
821 first polarized electrode layer
815 first electric double-layer capacitor
816 second electric double-layer capacitor
91 solar cell
92 power generating portion
93 power storage portion 94 photoelectrode
94e semiconductor layer
94d photosensitizing dye
95 common electrode
96 catalyst layer
97 first electrolytic solution
98 second electrolytic solution
99 electric storage portion electrode
910 first conductive polymeric molecule layer
911 second conductive polymeric molecule layer
100 load

The invention claimed is:

1. A dye-sensitized solar cell comprising:
a collective electrode having a light-transmitting function, which is formed on an inner face of a tube-shaped vessel formed of a transparent glass,
a photoelectrode, which is provided inside the collective electrode, which is electrically connected to the collective electrode and, which is a semiconductor layer having a dye adsorbed thereon, and
a counter electrode, which is apart from and inside the photoelectrode;
first and second sealed portions, which are made of glass and formed into a flat shape at both ends of the tube-shaped vessel, respectively;
a first external lead connected to the photoelectrode and a second external lead connected to the counter electrode;
wherein the first external lead is electrically connected to the photoelectrode through a first metal foil embedded in the first sealed portion and a first internal lead connected to the first metal foil and the photoelectrode, and the first external lead is drawn out of the first sealed portion,
the second external lead is electrically connected to the counter electrode through a second metal foil embedded in the second sealed portion and a second internal lead connected to the second metal foil and the counter electrode, and the second external lead is drawn out of the second sealed portion,
an electrolytic solutiones filled in the tube-shaped vessel,
the counter electrode also serves as a positive polarized electrode,
the counter electrode, a negative polarized electrode arranged apart therefrom inside of the counter electrode,
a separator arranged between the counter electrode and the negative polarized electrode, and the electrolytic solution filled therein, serve as an electric double layer capacitor
a third metal foil embedded in the first sealed portion made of glass and connected to a third internal lead connected to the negative polarized electrode and a third external lead connected to the negative polarized electrode through the third metal foil.

2. The dye-sensitized solar cell according to claim 1, wherein the tube-shaped vessel is a circular tube-shaped vessel having a circular cross section in a longitudinal direction thereof, and the counter electrode has an arcuate shaped portion.

3. The dye-sensitized solar cell according to claim 2, wherein the counter electrode and the electric double-layer capacitor are formed of a roll body formed by winding a band-shaped laminated sheet,
the laminated sheet includes:
a layer forming a counter electrode which also serves as a positive polarized electrode,
a layer forming a negative polarized electrode arranged apart therefrom on the inside of the layer forming the counter electrode, and
a separator arranged between the layer forming the counter electrode and the layer forming the negative polarized electrode, and
a portion between the layer forming the counter electrode and the layer forming the negative polarized electrode is filled with the electrolytic solution.

4. The dye-sensitized solar cell according to claim 3, wherein the band-shaped laminated sheet is wound twice or more,
the electric double-layer capacitor of an $n+1^{th}$ turn ($n \geq 1$) of the roll body, and a capacitor formed between a positive polarized electrode of the $n^{th}$ turn and a negative polarized electrode of the $n+1^{th}$ turn are in the parallel relationship.

* * * * *